US008713560B2

(12) United States Patent
Neumann et al.

(10) Patent No.: US 8,713,560 B2
(45) Date of Patent: Apr. 29, 2014

(54) COMPATIBILITY CHECK

(75) Inventors: Stefan Neumann, Walldorf (DE);
Sebastian Pulkowski, Eggenstein (DE);
Markus Schmidt-Karaca, Heidelberg (DE)

(73) Assignee: SAP AG, Walldorf (DE)

( * ) Notice: Subject to any disclaimer, the term of this patent is extended or adjusted under 35 U.S.C. 154(b) by 60 days.

(21) Appl. No.: 13/335,421

(22) Filed: Dec. 22, 2011

(65) Prior Publication Data
US 2013/0167135 A1 Jun. 27, 2013

(51) Int. Cl.
*G06F 9/44* (2006.01)

(52) U.S. Cl.
USPC .......................................... 717/174; 717/175

(58) Field of Classification Search
USPC .......................................................... 717/174
See application file for complete search history.

(56) References Cited

U.S. PATENT DOCUMENTS

| | | | |
|---|---|---|---|
| 7,415,707 B2 * | 8/2008 | Taguchi et al. | 717/174 |
| 7,979,854 B1 * | 7/2011 | Borole et al. | 717/172 |
| 2004/0128668 A1 * | 7/2004 | Iuchi | 717/174 |
| 2005/0066325 A1 * | 3/2005 | Mori et al. | 717/174 |
| 2005/0205660 A1 * | 9/2005 | Munte | 235/379 |
| 2007/0112906 A1 * | 5/2007 | Liu et al. | 709/200 |
| 2007/0157195 A1 * | 7/2007 | Gaa-Frost et al. | 717/174 |
| 2009/0182600 A1 * | 7/2009 | Lungu | 705/7 |
| 2009/0210869 A1 * | 8/2009 | Gebhart et al. | 717/174 |
| 2010/0058325 A1 * | 3/2010 | Macken et al. | 717/174 |
| 2010/0175059 A1 * | 7/2010 | Wetherly et al. | 717/170 |
| 2011/0309151 A1 * | 12/2011 | Cudzilo | 235/470 |

* cited by examiner

*Primary Examiner* — Don Wong
*Assistant Examiner* — Theodore Hebert
(74) *Attorney, Agent, or Firm* — Mintz Levin Cohn Ferris Glovsky and Popeo, P.C.

(57) ABSTRACT

System, method and a computer program product for providing a compatibility check are disclosed. Compatibility check includes selecting a solution for purchase by a user, wherein the selected solution is configured to be desired for operation in a first system, performing a compatibility check to determine whether the selected solution is capable of operating in the first system, generating results of the compatibility check, and determining, based on the generated results, whether to purchase the selected solution.

18 Claims, 11 Drawing Sheets

COMPATIBILITY CHECK

TECHNICAL FIELD

This disclosure relates generally to data processing and, in particular, to determining whether various systems, methods, and/or solutions are compatible with other systems, methods, and/or solutions. In some implementations, this disclosure relates to systems and methods for checking compatibility of business solutions and systems.

BACKGROUND

Today, businesses rely on business enterprise resource planning ("ERP") systems, solutions, programs, and other software to assist them in performing various tasks as well as allowing them to run smoothly. The day-to-day operations may include a multitude of tasks such as purchasing, selling, distribution, payroll, accounting, benefits, security, maintenance, and various other tasks that businesses need to stay afloat in a dynamic marketplace. The ERP systems, solutions, and other software that may perform these tasks may come from different vendors and/or designed using different computing platforms (e.g., programming languages, operating environments, etc.). As such, in order for businesses to have full and uninterrupted uses of all of their ERP systems, solutions, and other software, it is desirable that such ERP systems, solutions, and other software be compatible with one another. This is especially true in cases where new ERP systems, solutions, and other software are added to existing ERP systems, solutions, and other software.

An ERP system, solution, and other software that is not compatible with existing ones may result in various problems for businesses that may range from a small computing problems affecting minor aspects of businesses' operations to major system crashes that affect entire operations of the businesses, thereby causing significant financial harm. Compatibility problems may arise, for example, from one ERP system, solution, and other software not being able to communicate with another in view of the two not being written in the same programming language, environment, and/or not designed to communicate with one another by its developers, and/or for any other issues.

Thus, an a priori determination that a particular ERP system, solution, and other software is compatible with the ERP systems, solutions, and other software that is currently being installed and used by the business can avoid such problems. Such determination not only can allow for a smooth operation of the business but can also save cost of purchasing an ERP system, solution, and other software that is incompatible with existing ones. As such, there is a need for a system and/or a method for performing compatibility checking of an ERP system, solution, and/or other software with existing ERP systems, solutions, and other software prior to purchasing, implementing, and/or installing such ERP system, solution, and other software.

SUMMARY

In some implementations, the current subject matter relates to a computer-implemented method. The method can include selecting a solution for purchase by a user, wherein the selected solution is configured to be desired for operation in a first system, performing a compatibility check to determine whether the selected solution is capable of operating in the first system, generating results of the compatibility check, and determining, based on the generated results, whether to purchase the selected solution. At least one of the selecting, the performing, the generating, and the determining can be performed on at least one processor.

In some implementations, the current subject matter can be configured to include one or more of the following optional features. The selected solution can be configured to be desired for operation in an enterprise resource planning system. The selected solution can be configured to be desired for operation on at least one device in the enterprise resource planning system. The selected solution can be also configured to be desired for operation on a device of the user.

The results can include at least one of the following: a determination that the selected solution is capable of operating in the first system, a determination that an additional solution is required for operation of the selected solution in the first system, and a determination that the selected solution is not capable of operating in the first system.

The performing can include obtaining information concerning a first state of the first system, wherein the first state corresponds to an actual operation of the first system prior to implementation of the selected solution in the first system, determining a second state of the first system, wherein the second state corresponds to a proposed operation of the first system after implementation of the selected solution in the first system, and comparing the first state and the second state to determine whether the selected solution is capable of operating in the first system.

In some implementations, the method can include triggering, upon selecting the solution, the performing of the compatibility check.

In some implementations, the user can be configured to use a mobile device to select the solution.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
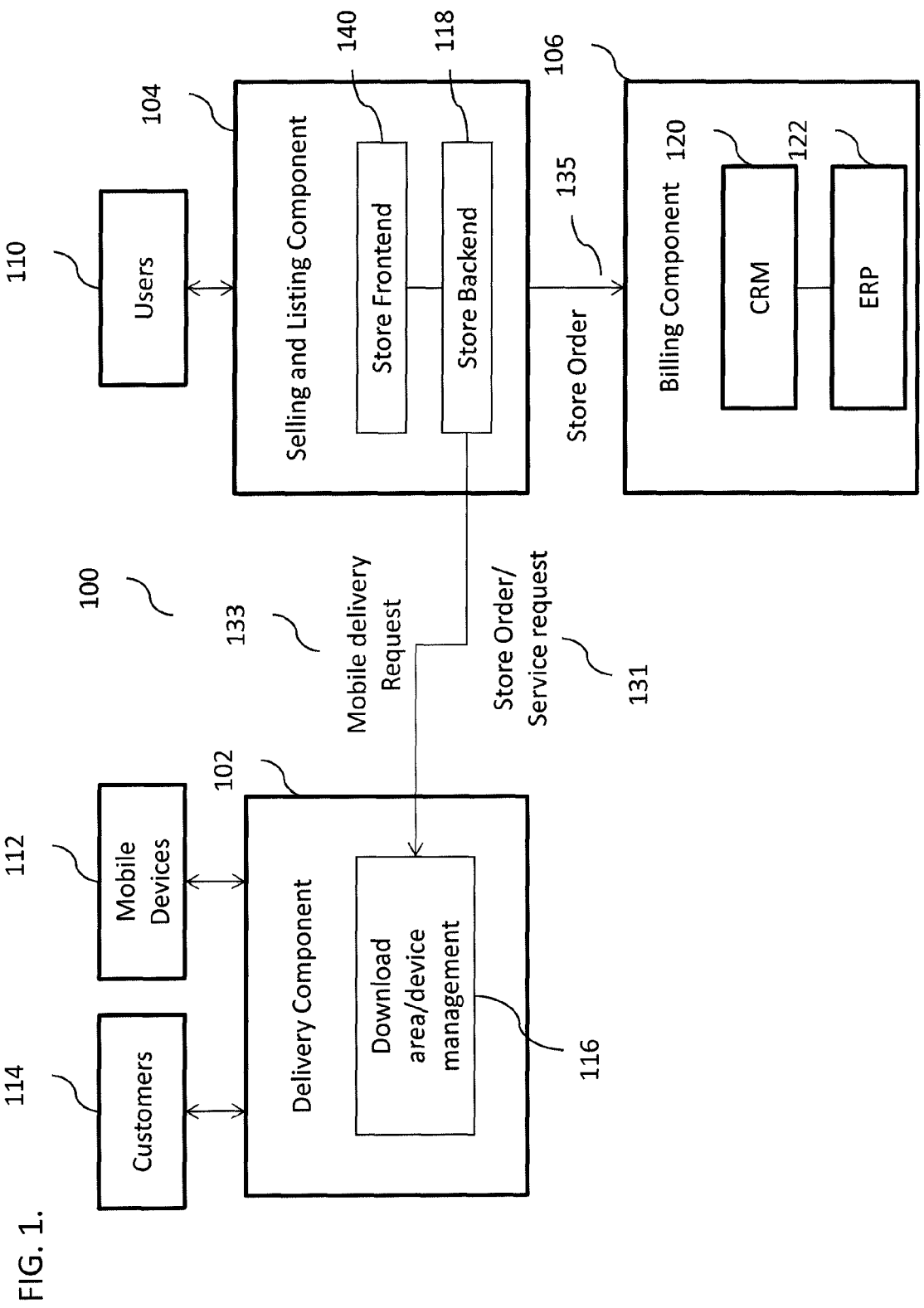
FIG. 1 illustrates an exemplary system for obtaining a business solution/application, according to some implementations of the current subject matter.

To address these and potentially other deficiencies of currently available solutions, one or more implementations of the current subject matter provide methods, systems, articles or manufacture, and the like that can, among other possible advantages, provide systems and methods for providing systems, methods, and computer program products for performing compatibility checking of various enterprise resource planning ("ERP") systems, operating systems, software, programs, applications and/or various business solutions (hereinafter, "solutions" or "business solutions" or "business solutions/applications").

In today's world, businesses as well as individual users use various mobile devices to conduct a substantial portion of their personal and business activities. Such activities typically include email, internet browsing, mobile programming, gaming, sales, purchasing, accounting, reporting, data transferring, transfer of funds, and many others. The activities are typically performed using various software that can be downloaded and installed on mobile devices. The software can be available from various vendors, which can include businesses themselves as well as third party vendors that may be providing desired functionalities to businesses. Businesses can also sell their software, business solutions, applications, programs, etc. for mobile device via mobile application software "store fronts" (e.g., that can be available on the internet), third party vendors (e.g., iTunes that is available through Apple, Inc. Cupertino, Calif., USA), and/or have such business solutions pre-installed on users' mobile devices. Alternatively, businesses can also provide such business solutions free of charge or on some other basis. The mobile devices can include cellular telephones, portable computers, laptops, smartphones, Blackberry devices, iPhone, iPad, iPod, personal digital assistants (PDAs), Palm Pilots, and/or any other suitable devices.

To obtain a particular business solution/application from a business, a user can access that business's business solution mobile store front and select a particular business solution/application from a listing or a catalog of solutions available on that business' store front. Alternatively, the user can search for a specific business solution on the internet utilizing a browser function on the user's mobile device without directly accessing a store front. As stated above, the user's mobile device can also be pre-installed with either the desired business solution(s) and/or have a store front of that particular business pre-installed, which the user can use to obtain a desired business solution.

The user can purchase the solutions while acting in different capacities, including an enterprise user purchasing business solution(s) for a company, an end user purchasing business solution(s) for his/her company mobile device, an end user purchasing business solution(s) via a Web browser, and/or the user acting in any other capacity. While acting in one or several different capacities, the user can be charged with obtaining and/or purchasing various business solutions for installation on the user's mobile device, on business's mobile devices, on business's other devices, on devices of specific users of the business, as well as for any other purposes. The user can be also charged with obtaining cost quotations (including monetary costs, labor costs, application costs, processing costs, installation costs, additional components costs, and/or any other costs) for purchasing of particular business solutions and for providing them to the business prior to receiving authorization to purchase.

The mobile store fronts (such as the SAP Store of SAP AG, Waldorf, Germany) can include a listing of various business solutions in a form of a catalog, which the user can browse in order to select a particular business solution. The user can also filter the catalog in search for a particular business solution using one or more attributes. The attributes can include, but are not limited to, business solution's or application's operation system ("OS") type/OS operating versions, solution type, industries, business area, language of the application, most popular applications, rating of applications, newly available applications, cost, topics (e.g., "Analytics", "Sales", etc.), capacity of the user, etc. The filtering can also include classification of the applications according to at least one the following activities: application OS type: (e.g., Blackberry, Apple, etc.), OS version (e.g., Apple iOS 4.3), solution type (e.g., mobile application), language of the application, application family (e.g., combination of multiple applications into a single product but with different OS/device types), application's release status (e.g., released, in beta mode, etc.), application's store visibility (e.g., a complete SAP Store, a company store, etc.), application's location (e.g., local download from store/backend, third party store, such as, for example, an Apple application store, that is send to customer via a partner), application cost range (e.g., free, $0.01-10, more than $10, etc.), application type (e.g., native application connected directly to a backend system, player application which can require s backend user, a web application, etc.), a latest version of the application, a specific version of the application, a requirement of installation of another application and other components/systems (e.g., installation of application only, backend components being necessary, user license being necessary, etc.).

To locate a particular application, the user can initiate a search at the store front using various keywords, categories, features, attributes, filters, etc. After the search, a list of possible applications can be presented to the user, which can reflect the search/filtering. For each application in the list, the following information can be presented (or otherwise be requested through various menus and requests): name of the application, short description of the application, rating of the application (with possibility to drill down to a single evaluation), for which mobile device the application exists, pricing information, symbol for video/demo drill down, symbol for screenshot, symbol for drill down to technical information/requirements of the application, a details button (e.g., hyperlinks linking the user to additional detail information), number of available downloads for a particular application, an option for evaluation after registration and download, an option to directly buy the application, as well as any other desired information about each application in the list.

The store front can also include various features that can assist the user in the search, selection, and/or purchasing/obtaining of a specific application. Such features can include, but are not limited to, information about device recognition (including recognition of device's underlying OS version), information about a process for employees to upload content into the store front, discussion of content, internal catalog information that can only be visible by employees of a company, a portion of the store front and/or entire store front that can be especially dedicated to obtaining mobile content (e.g., by searching for applications using product and/or device), selection criteria information in the catalog, download area information (e.g., external and/or internal), internal and/or external download possibilities, as well as any other features that can assist the user in obtaining business solutions using user's mobile device.

In some implementations, the store front can be configured to operate based on various principles, which can include selling and listing, billing, and delivery of business solutions/applications. FIG. 1 illustrates an exemplary architecture 100 of an infrastructure that can be configured to implement these principles (such exemplary architecture is available from SAP AG, Waldorf, Germany). The architecture 100 includes a delivery component 102, a selling and listing component 104, and a billing component 106. The selling and listing component 104 can be configured to provide a catalog of business solutions/applications, where the catalog can be configured to provide a description of the business solutions/applications in a way that it can become attractive to the user. The catalog can be accessible through a user interface disposed as part of the component 104. Using the user interface, the user can select a business solution/application from the catalog and upon selection, can complete a sales order for the selected solution/application. The infrastructure can be configured to identify the sold solution/application outside the store front in order to get a match between what had been sold and what will be delivered to the user. In some implementations, the sellable units can include software, installation, and/or provisioning of on-demand software and/or services. Users 110 can access the selling and listing component via the store frontend 140 having a user interface, which can present the users 110 with a catalog of available business solutions/applications and allow the users 110 to browse/search for a desired business solution/application. The selling and listing component 104 can also include a store backend 118 coupled to the store frontend 118, which can receive selection of business solutions/applications by users 110 and can forward a delivery request 133 to the delivery component 102 as well as a store order 135 to the billing component 106.

In some implementations, the selling and listing component 104 can include a user interface that can allow the user to browse/search, select, obtain, and/or purchase a particular business solution/application. The user interface can be configured to have a specialized look and feel, a separate entry point just for a mobile device, and/or a special layout when displaying mobile catalog items as there can be different parameters to be displayed. In some implementations, the user interface can also provide a link that the user can select for immediate download/installation of the selected/purchased business solution/application. It can also allow the user to download/install the selected/purchased business solution/application at a predetermined time. The user interface can also provide various other options that can accommodate the user during user's selection/purchasing experience of the business solution/application.

The billing component 106 can include a customer relationship management ("CRM") system 120 and an enterprise resource planning ("ERP") system 122. The billing component can be configured to handle various aspects of billing and payment for the business solutions/applications selected by the user 110 at the selling and listing component 104. Exemplary CRM and ERP systems 120, 122 are available from SAP AG, Waldorf, Germany, and can handle billing, payment, reporting, storage, customer service, etc. that are associated with purchasing.

The delivery component 102 can be configured to handle store order/service requests 131 and/or mobile delivery requests 133 that are received from the selling and listing component 104. Such requests are associated with the business solutions/application that is selected by the user 110 at the selling and listing component 104. The component 102 can include a download/device management area/service provider 116 that can handle such requests and provide purchased business solutions/applications to customers 114 and/or mobile devices 112.

In some implementations, the delivery component 102 can be configured to operate based on various components and/or requirements that can be associated with delivery of selected/purchased business solution/application to customers. These can include a repository for installer files for various supported platforms, a directory of available applications, an ability to download an installer application that can allow installation of the selected/purchased business solution/application, a device recognition to indentify the right version of selected/purchased business solution/application, various accessibility options available from the device, license management that can allow verification of whether the download is approved and the individual who is downloading the selected/purchased business solution/application is authorized to so, a device management capability that can perform a push of the selected/purchased business solution/application to various devices, a contingent handling capability that can perform a countdown of downloads based on a license contingent, a user management capability that can identify a user and its relationship to the purchasing organization, an authentication capability that can allow access to selected/purchased business solution/application by users having proper permissions (which can be based on prior purchases), an integration with software logistics processes (which can include development of applications, versioning, release dependency, dependency to backend releases), a legal requirement, a verification capability that can ensure that only verified applications are uploaded, an integration capability that allows integration with customers device management tools, an on-site download at customer infrastructure capability, a capability of transferring of purchased installers to customer site for internal distribution, a bandwidth optimization capability, various support capabilities, scalability and load balancing capabilities, streaming capabilities, mechanisms to cover unstable connectivity, and/or other capabilities, and/or any combination thereof.

In some implementations, the delivery request message 133 can be configured to include a name and identification of the selected business solution/application, a number of licenses (e.g., a number of users/devices that can be authorized to download, install and/or use the application), and/or various authentication details.

Figure 2:
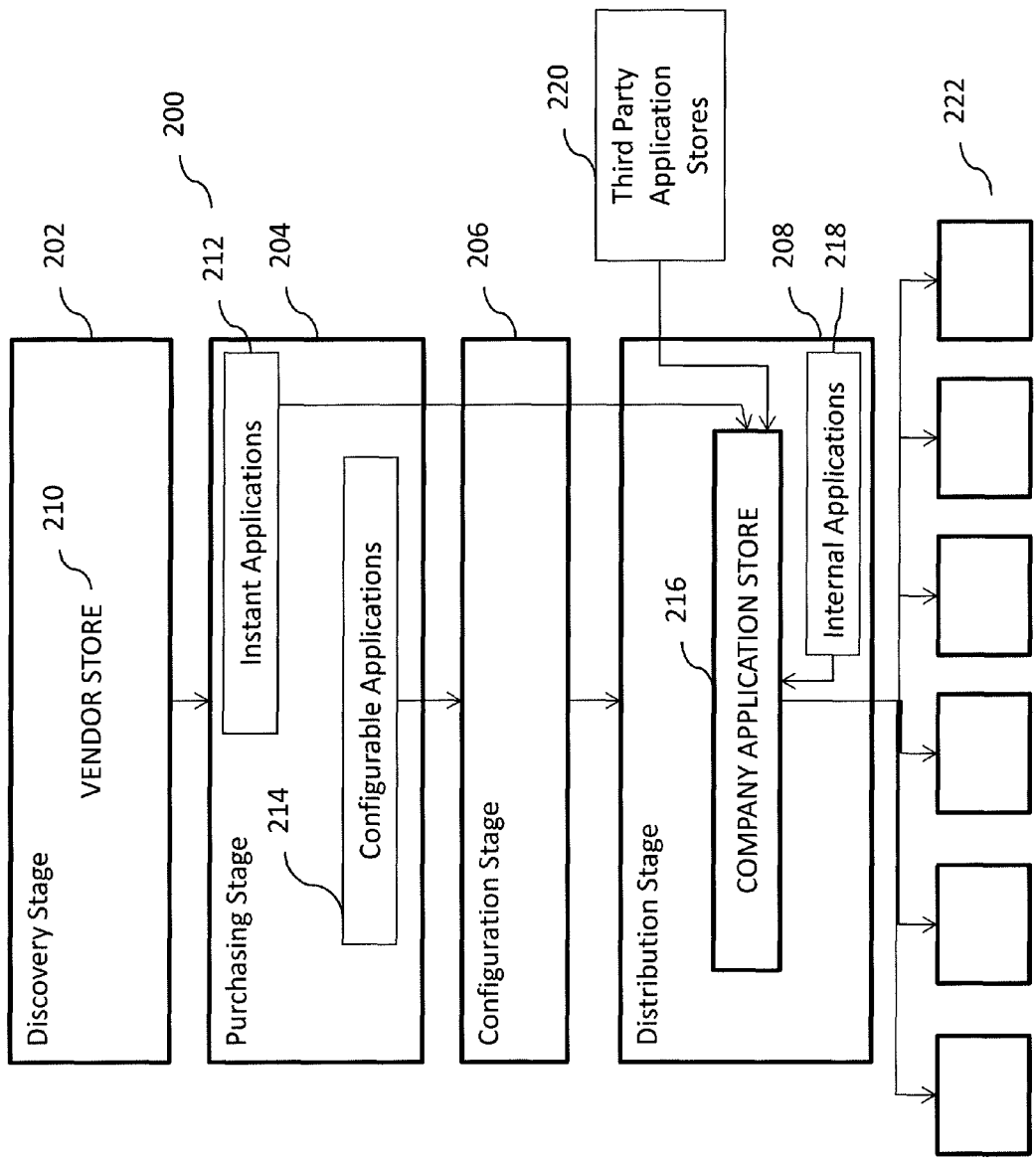
FIG. 2 illustrates an exemplary system for obtaining a business solution/application and performing a compatibility check, according to some implementations of the current subject matter.

FIG. 2 illustrates an exemplary system process flow 200 for a mobile solution that can be utilized by a user for searching, selecting, obtaining a particular business solution/application as well as checking its compatibility with user's systems, according to some implementations of the current subject matter. At 202, the user can be configured to access a vendor store 210 to conduct a discovery or search for a particular business solution/application. Alternatively, the user can browse all business solutions/applications that may be available from the vendor. The vendor can have different types of business solutions/applications that can be made available to the user, which can include instant applications 212 (i.e., those that the user can install in an as-is format without any configuration) and configurable applications 214 (i.e., those that the user can customize to fit the user's needs). While searching for a particular business solutions/application, the user can also determine whether or not vendor's applications are compatible with the user's system. This can be done by requesting appropriate information about vendor's application or providing appropriate search keywords corresponding to the compatibility requirements of the user's system.

In some implementations, an instant application can be a lightweight solution which can include only the application that is installed on the device and can be connected to the backend and used instantly. This type of application can be purchased by the company purchaser or end user purchasing a license on behalf of the company (e.g., purchasing for a company device).

In some implementations, a more complex scenario can involve installation of various additional components like Gateways, ERP add-ons, backend components, etc. The purchase process can include license negotiations, application of discounts, etc., which can lead to an analysis of the existing system environment and a request for a quote from the customer concerning pricing (or any other costs) for a particular business solution/application. A compatibility check determines whether or not a particular selected business solution/application will work in the user's system, requires add-ons, other software, etc.

If an instant application 212 is selected by the user, the process proceeds to distribution, at 208, where the selected application is provided to the user's company application store 216 and eventually to mobile devices 222 that are associated with the user's company. A compatibility check can be performed at that stage as well to determine whether the selected instant application 212 is compatible with the user's system. If a configurable application 214 is selected, the application can be configured, at 206, prior to being provided to the company application store 216. The configured application can be checked for compatibility with the user's system. Other applications, such as third party applications 220 and internal applications 218, can also be provided to the company application store for eventual distribution to mobile devices 222. Compatibility of these applications can be checked as well prior to distribution of the applications to mobile devices or other components or systems/sub-systems of user's system.

Figure 3:
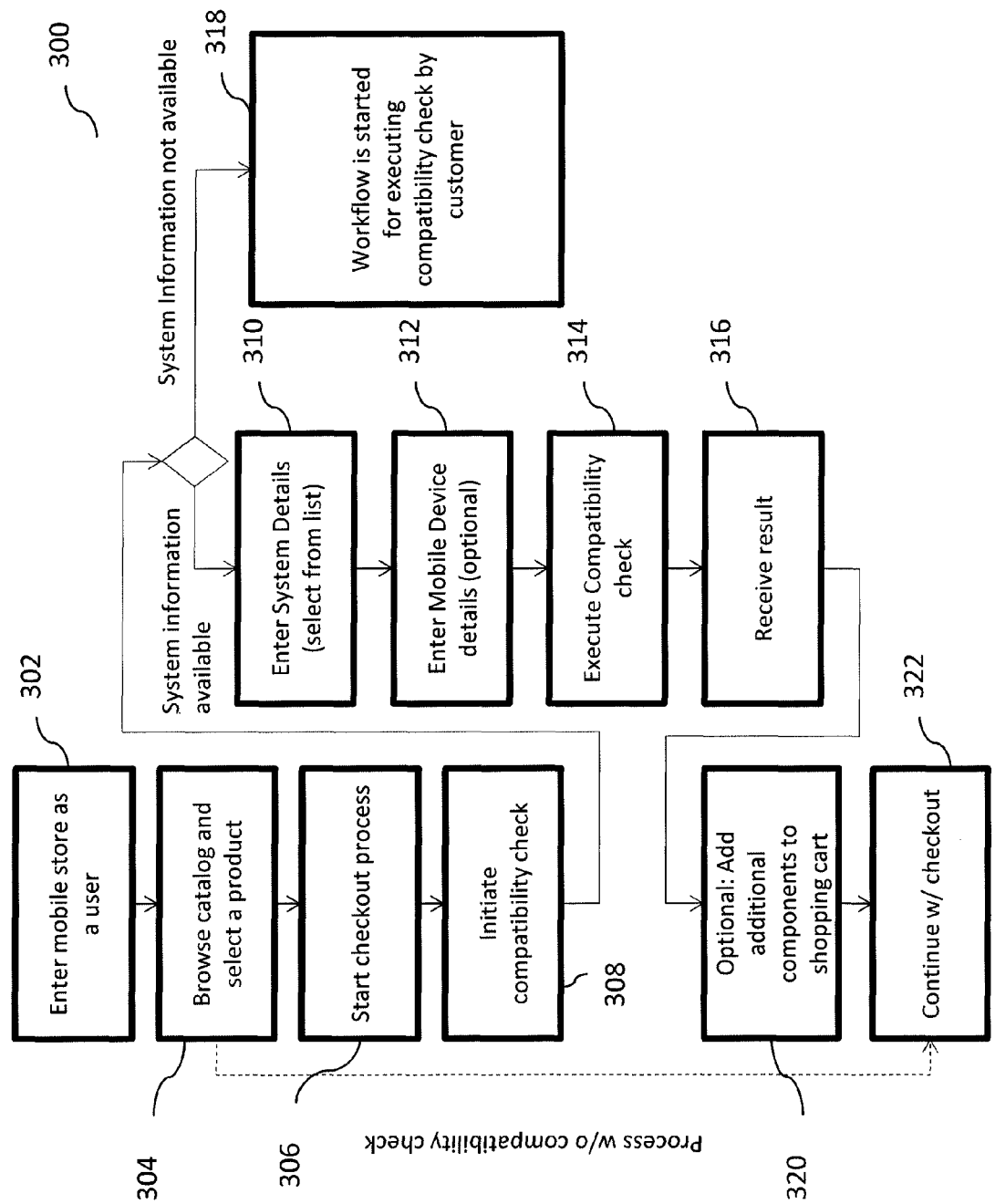
FIG. 3 illustrates an exemplary process for performing a compatibility check, according to some implementations of the current subject matter.
Figure 4:
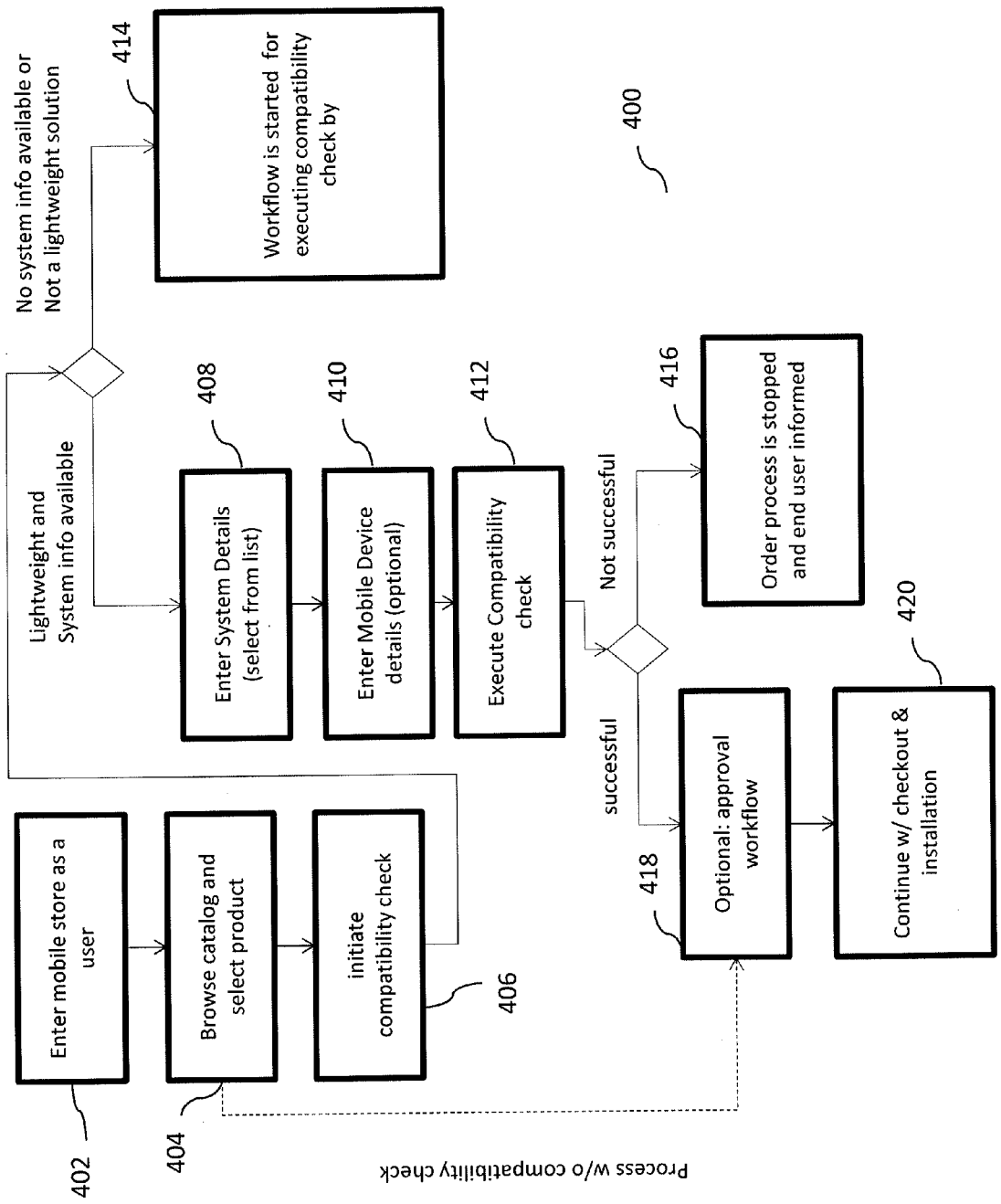
FIG. 4 illustrates another exemplary process for performing a compatibility check, according to some implementations of the current subject matter.
Figure 5:
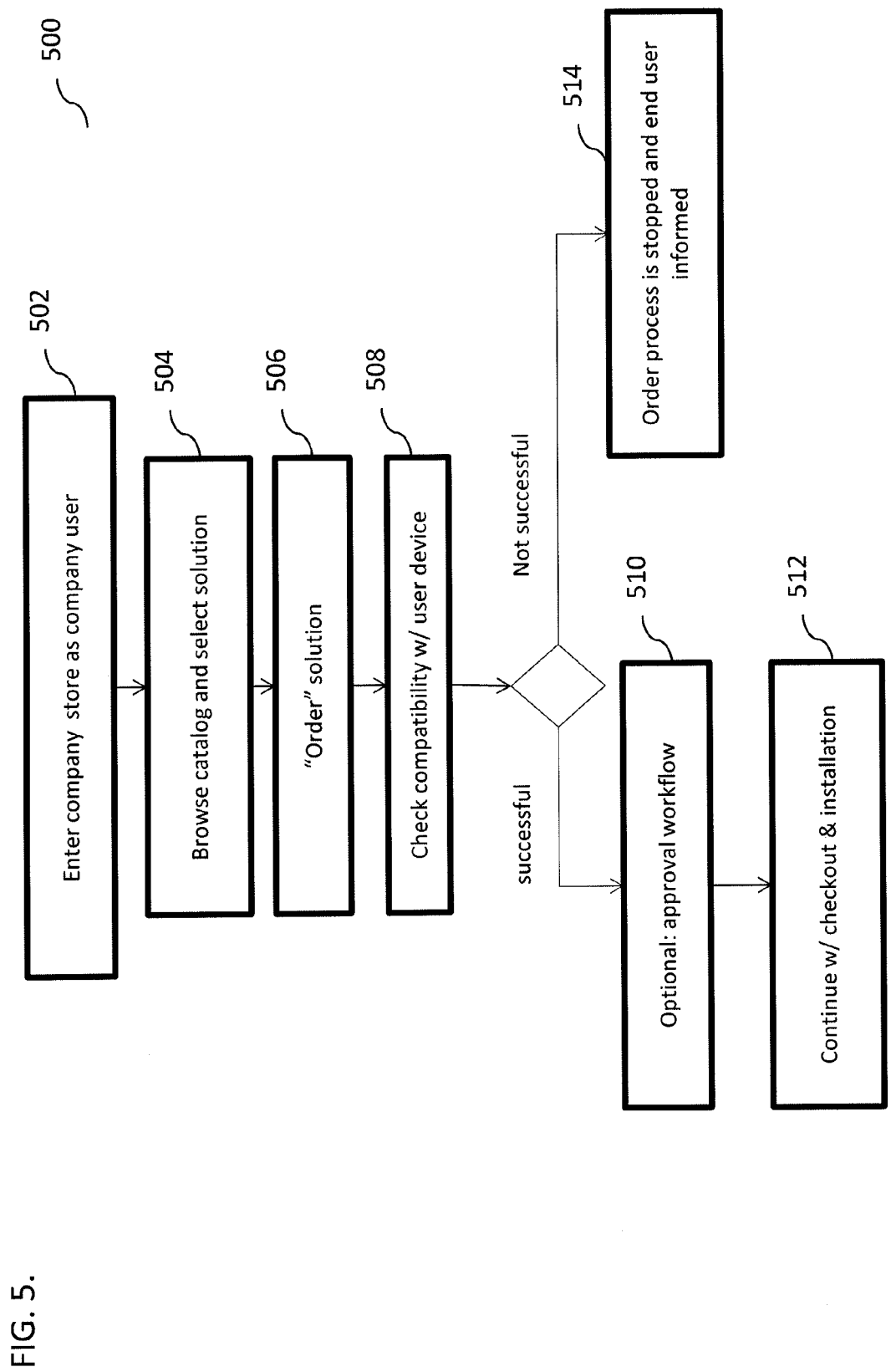
FIG. 5 illustrates another exemplary process for performing a compatibility check, according to some implementations of the current subject matter.

Thus, the current subject matter can be configured to provide a seamless buying experience for the user from initial discovery of a business solution/application at 202 to trying on the business solution/application on a mobile device up to ordering the business solution/application through the commercial platform. At various stages of this process, compatibility checks can be performed to determine whether or not the selected business solution/application is compatible with the user's system and/or various mobile devices associated with the user's system. The following discussion provides different scenarios during which a compatibility check can be performed. Each of these scenarios are illustrated in FIGS. 3-5 and include:

a) A purchaser in a company purchasing a business solution/application for the purposes of distributing internally to end users, where the end users can have different device types. This can involve purchasing of multiple licenses for installation/use of the selected business solution/application.

b) A user purchasing a lightweight business solution/application and checking whether the solution can be used with the current system on his/her device.

c) A user browsing the company catalog and checking that the user is able to install the business solution/application on his/her mobile device.

These scenarios are exemplary and can be implemented by using a mobile device, a stationary device or any other system that may have various types of user interfaces (e.g., a screen, a keyboard, a mouse, a touch screen, etc.) as well as an appropriate operating system, software, firmware, hardware, and/or any other requisite components.

FIG. 3 is an exemplary flowchart illustrating a process 300 for purchasing of a business solution/application by a user for the purposes of distributing to multiple devices within user's company, according to some implementations of the current subject matter. At 302, the user can enter a mobile store. The user can be registered or unregistered. At 304, the user can browse a catalog of the mobile store to select a particular business solution/application. At this time, the user can have an option to proceed with check out, i.e., completing the purchase of the selected business solution/application without performing a compatibility check. If the user desires to perform the compatibility check, the user can proceed to the check out process, at 306.

At 308, a compatibility check can be initiated. If user's system information is not available, the compatibility check can be performed by the user and/or the user's system administrator, at 318. If the user's system information is available, the system information is entered, at 310. The user can enter the following information: a selection of a particular backend ERP system using an installation number, which can be associated with a business partner that is attached to the user (e.g., a company for which the user can be purchasing a business solution/application); a gateway information, which can be used as a mobile infrastructure; a list of mobile device types on which the solution is planned to be distributed; a selection of countries in which the business solution/application is planned to be installed; a selection of languages the company needs, as well as any other information. Alternatively, the system information can be selected from a list that can be presented to the user by a vendor of the business solution/application based on the information available to the vendor. In some implementations, the system information can be made available to the vendor upon user's registration with the vendor and the user providing information about his/her system. At 312, mobile device information for which the selected business solution/application is intended can be entered (multiple device information can be provided).

At 314, a compatibility check can be executed and results of the check can be received at 316. The compatibility check can provide the following results: a check status (e.g., successfully executed, was not able to execute, ongoing/checking, etc.); a coarse result of the check as an image and a short text (e.g., positive w/o changes, positive w/changes, need individual consulting, not positive, etc.); a table with details showing the required status per software component (which can be necessary to operate a mobile solution), the current system status in the selected system/installation number and the result for the software component; a list of proposed project steps to be executed to implement the solution in the customer environment; an estimation of the project size to make the business solution/application compatible and an effort estimation (e.g., low, medium, high); an option to include missing parts out of the compatibility check into the shopping cart; as well as any other information.

If the compatibility check indicates that the selected business solution/application is compatible with the user's system and/or does not require any additional components to be installed, the user can proceed to check out, at 322. Alternatively, the user can add additional components to the shopping cart, at 320. Such additional components can be necessary for compatibility of the selected business solutions/application with the user's system.

FIG. 4 is an exemplary flowchart illustrating a process 400 for purchasing of a business solution/application by a user to be used on the user's company device, according to some implementations of the current subject matter. At 402, the user (registered or unregistered) can enter the store for the purposes of selecting a business solution/application for use on his/her company device. At 404, the user can browse the catalog and select a product. The user can have an option to opt out of the compatibility check and proceed directly to checkout and installation. Otherwise, a compatibility check can be initiated at 406. If the user's system information is not available or otherwise, the user is not purchasing a lightweight solution (i.e., the solution for installation on user's device only), the compatibility check can be performed by the user and/or his system's administrator. Otherwise, if the system's information is available, the system's details can be entered, at 408. As stated above, the system details can be entered from an existing list, database, etc. At 410, information about a mobile device can also be entered.

At 412, the compatibility check can be executed based on the entered information and information about the selected business solution/application. If the check is not successful, the purchasing (and/or installation) can be terminated and the user can be appropriately notified. Otherwise, the user can proceed to checkout, at 420, assuming appropriate approvals can be obtained, if necessary, at 418.

FIG. 5 is an exemplary flowchart illustrating a process 500 for purchasing a business solution/application by a company user from a company store, according to some implementations of the current subject matter. At 502, the user can enter the company store as a company user and browse company catalog and select a business solution/application, at 504. The information stored about a company user can include at least one of the following: user login; role(s) and profiles that the user can have; the device information OS type and OS-version/mobile device type; the user's telephone number(s); the IMEI addresses of the devices; and/or any other information.

At 506, the user can order the selected business solution/application. At 508, the compatibility check of the selected solution/application with the user's device can be performed. If it is successful, the user can proceed to checkout and installation, assuming appropriate approvals are obtained, if necessary, at 510-512. The compatibility check can include at least one of the following results: the user is allowed to install the solution (profile fits and users exist) and the solution/application meets the requirements of the applications; the user needs an additional backend user to be able to connect the selected solution/application with other applications; the user's device does not fit to the solution, in which case, the user can select another device where the solution/application can be installed on; cancel the request; interrupt/stop the request and get a new device; as well as any other results. Otherwise, the order process can be terminated and the user can be appropriately notified, at 514.

Figure 6:
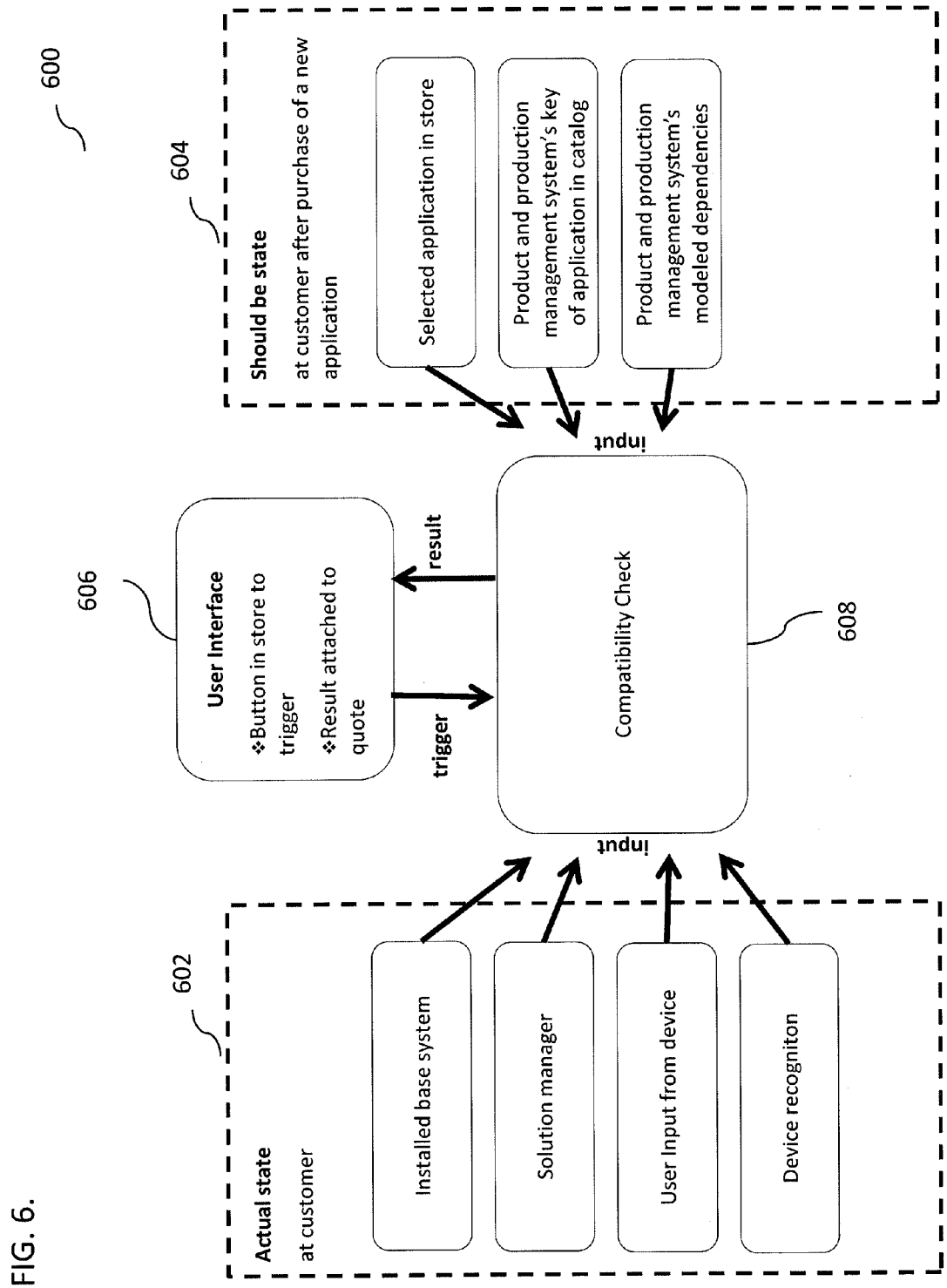
FIG. 6 illustrates an exemplary system for performing a compatibility check, according to some implementations of the current subject matter.

FIG. 6 illustrates an exemplary system 600 for performing a compatibility check for a selected business solution/application, according to some implementations of the current subject matter. To perform a compatibility check for a particular solution/application, the current subject matter can be configured to compare two states relating to the purchase of the solution/application: an actual state 602 of the user's system prior to the purchase of the solution/application and a "should be" or future hypothetical state 604 of the user's system after the purchase of the solution/application. The compatibility check 608 can be a tool and can be initiated using various triggers (e.g., the user selecting a link or pressing a button on the user's interface corresponding to the store where the user selected the solution/application). Upon receiving the trigger, various information about the actual state 602 and should-be state 604 is provided to the system performing the compatibility check. Upon completion of the compatibility check, the system outputs a result that can be provided to the user interface 606. The result can also include various recommendations to the user, e.g., installation of additional components, selection of a different business solution/application, etc., as well as a quotation reflecting the recommendations.

The information supplied about the actual state 602 can include information about system(s) installed and/or operating at the user's mobile device, mobile devices associated with the user's company, and/or system(s) installed and/or operating at the user's company's various devices, networks, databases, repositories, computing stations, and/or other components. This information can include various identifications associated with the installed/operating system(s), their various operating requirements, authorization information, user authorization information, and/or any other information. The compatibility check system 608 can also receive information from a solution manager that may exist/operate/manage the user's system(s). The solution manager can provide information about user's installed systems. The solution manager can also provide information about various components of the user's system(s), including information about other business solutions/applications installed, information about integration requirements of other components, and/or any other information. Additionally, the user of the device can provide some input to the compatibility check, which can include identification information, specific requirements of the user and/or the user's system(s), as well as any other information. The compatibility check can also receive user device recognition information. This information can assist the compatibility check system in determining whether a particular selected business solution/application is compatible with a user device that has appropriate recognition information.

The hypothetical or future system state 604, corresponding to the system state after the user purchased the selected business solution/application, can supply information about the selected business solution/application (e.g., application name, requirements, operational characteristics, etc.), as well as product and production management system's (PPMS) application key in the catalog of applications and any modeled dependencies that exist in the PPMS. The PPMS can be configured to provide various data for various software components and/or software products in the overall user's system. An exemplary PPMS is available from SAP AG, Waldorf, Germany. Upon receiving information concerning two states 602 and 604, the compatibility check 608 can determine whether or not user-selected business solution/application will be compatible with the user system(s).

Figure 7:
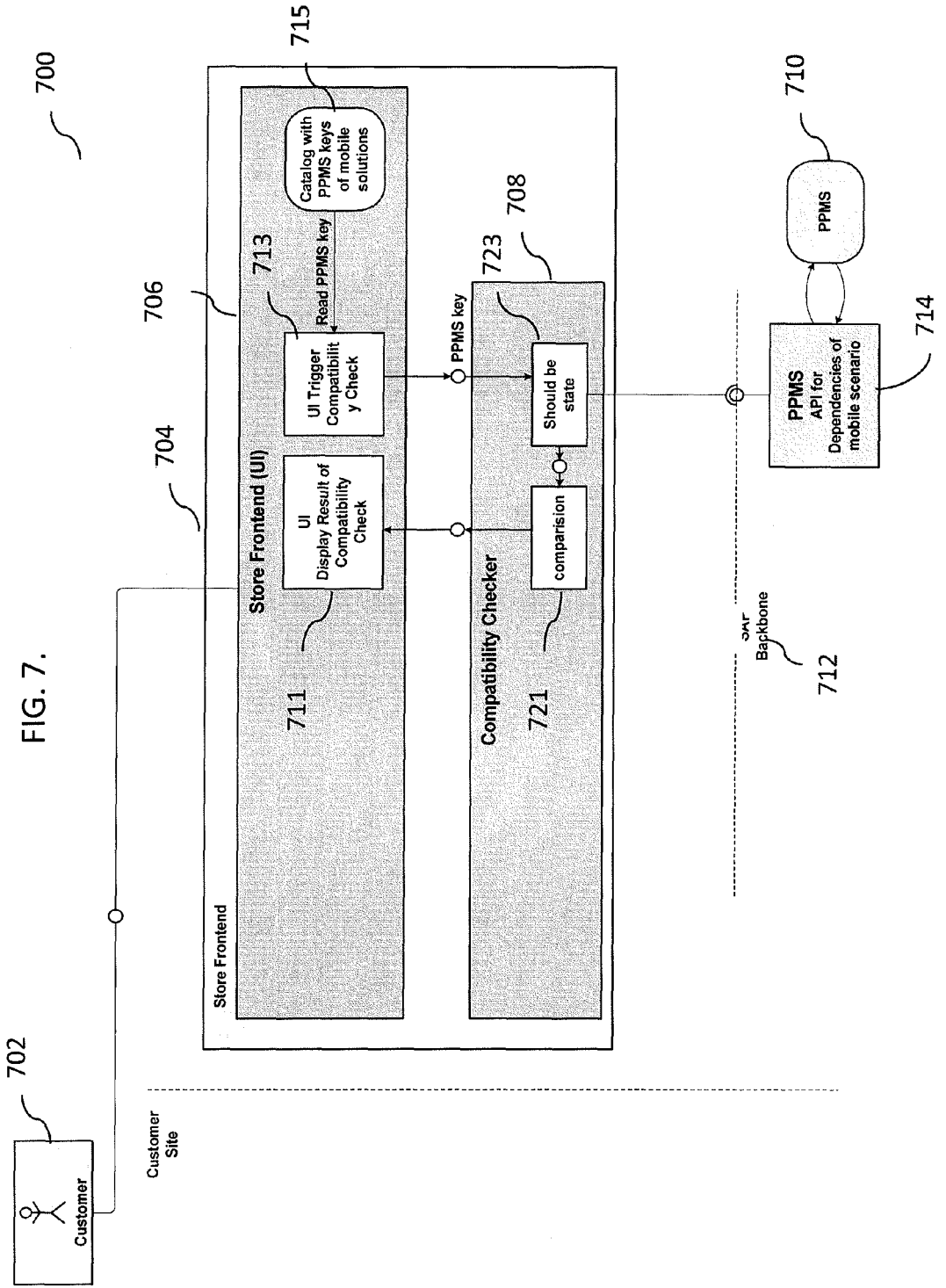
FIG. 7 illustrates another exemplary system for performing a compatibility check, according to some implementations of the current subject matter.

FIG. 7 illustrates an exemplary system 700 for performing a compatibility check, according to some implementations of the current subject matter. A customer or a user 702 can be configured access a store frontend 704 for the purposes of searching for and/or selecting a business solution/application for purchase. The store frontend 704 can include a user interface 706 to assist the user in selecting/purchasing business solution/application, running compatibility checks, receiving results of compatibility checks, as well as performing any other functions. The user 702 can purchase it for the company's system, for user's own mobile device, for company's mobile devices, for the user's company mobile device, and/or for any other purposes. The store frontend 704 can be configured to include a catalog 715 of business solutions/applications (along with appropriate identification keys, e.g., PPMS keys) which the user can browse to select a particular business solution/application. The catalog can be stored in a database or repository associated with the store frontend 704. The store frontend user interface 706 can also include a user interface 713 that can be configured to initiate or trigger a compatibility checker 708 by providing the checker 708 with the identification key of the selected business solution/application. The user interface 711 contained in the user interface 706 can also display results (including recommendations, quotations, etc.) of the compatibility check performed by the checker 708. The compatibility checker 708 can include a comparison system 721 that performs a comparison between an actual state of the user's system and a should-be or future state of the user's system 723. The should-be state of the user's system can be determined based on the provided identification (or PPMS key). The PPMS keys as well as information about various application dependencies can be separately accessed in a backbone system 712, which can be coupled to the store frontend 704.

Figure 8:
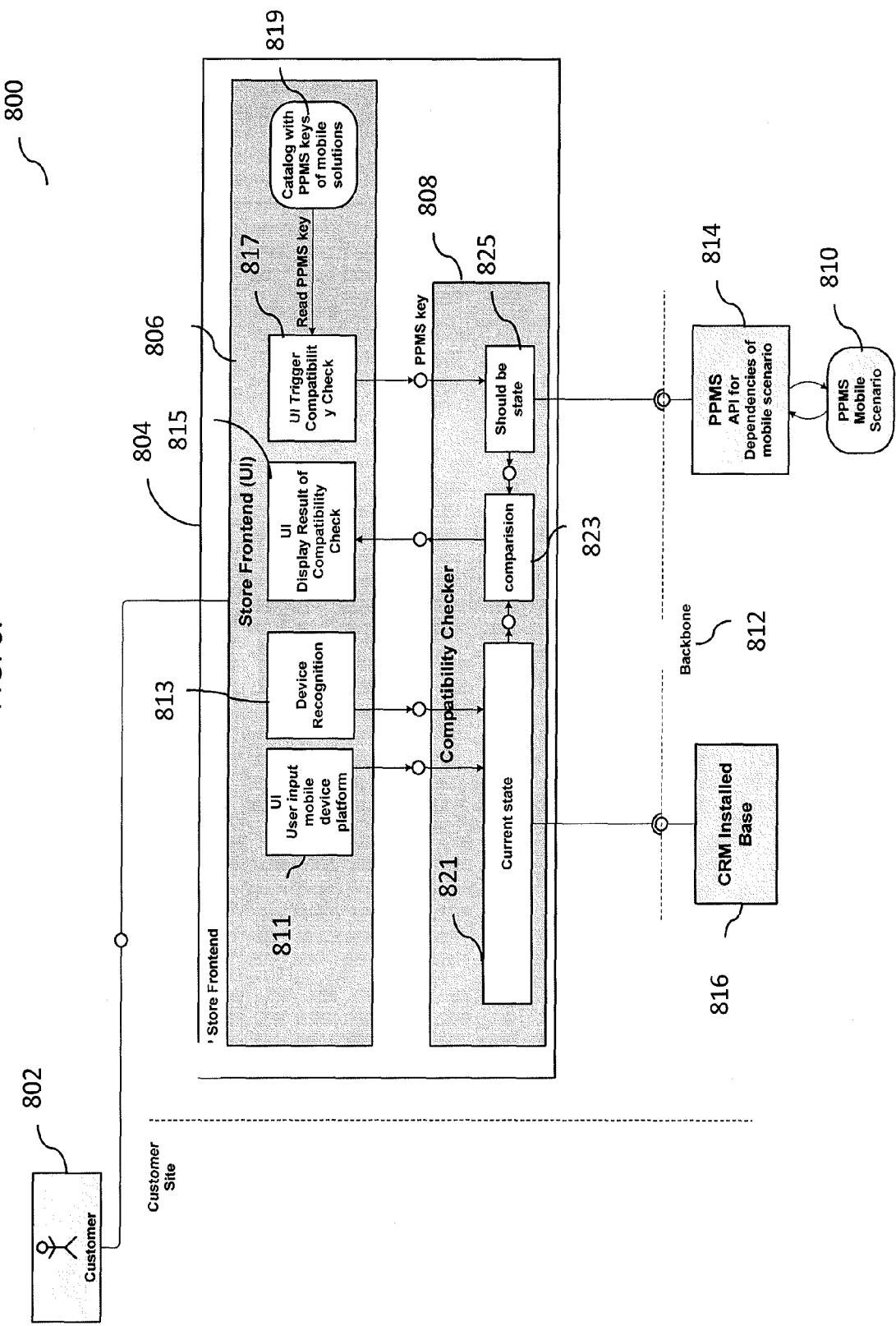
FIG. 8 illustrates another exemplary system for performing a compatibility check, according to some implementations of the current subject matter.

FIG. 8 illustrates another exemplary system 800 for performing a compatibility check, according to some implementations of the current subject matter. System 800 can have some similarity to the system 700 shown in FIG. 7 and discussed above. System 800 can include a store frontend 804 that includes a store frontend user interface 806 and a compatibility checker 808, where the store frontend component 804 can be configured to be coupled to a backbone component 812.

The store frontend user interface 806 can allow the user to provide user input from a mobile device platform 811, can perform recognition of user device 813, can trigger compatibility check 817 based on received PPMS keys 819 corresponding to the business solution/application. The user interface 806 can also be configured to display results of the compatibility checker 815.

The compatibility checker component 808 can be configured to include a current state information 821 concerning user's system, where the current state information can be obtained from the backbone 812, using, for example, information obtained from a customer relationship management system's installed base. The current state information 821 can also include information provided by the user interface component 806 and relating to the user input 811 and device recognition information 813. The compatibility checker 808 can be configured to include a comparison component 823 that performs comparison of the actual state of the user system to a should-be state 825 of the user system (i.e., a possible future state of the system after installation of the selected business solution/application). The future state information can be also supplied from the backbone 812 using components 810 (PPMS information concerning user's mobile systems) and 814 (PPMS information relating to various dependencies). Upon completion of the compatibility check, the comparison component 823 can provide information to the user interface 806, which can be displayed to the user along with recommendations, cost quotations, etc.

Figure 9:
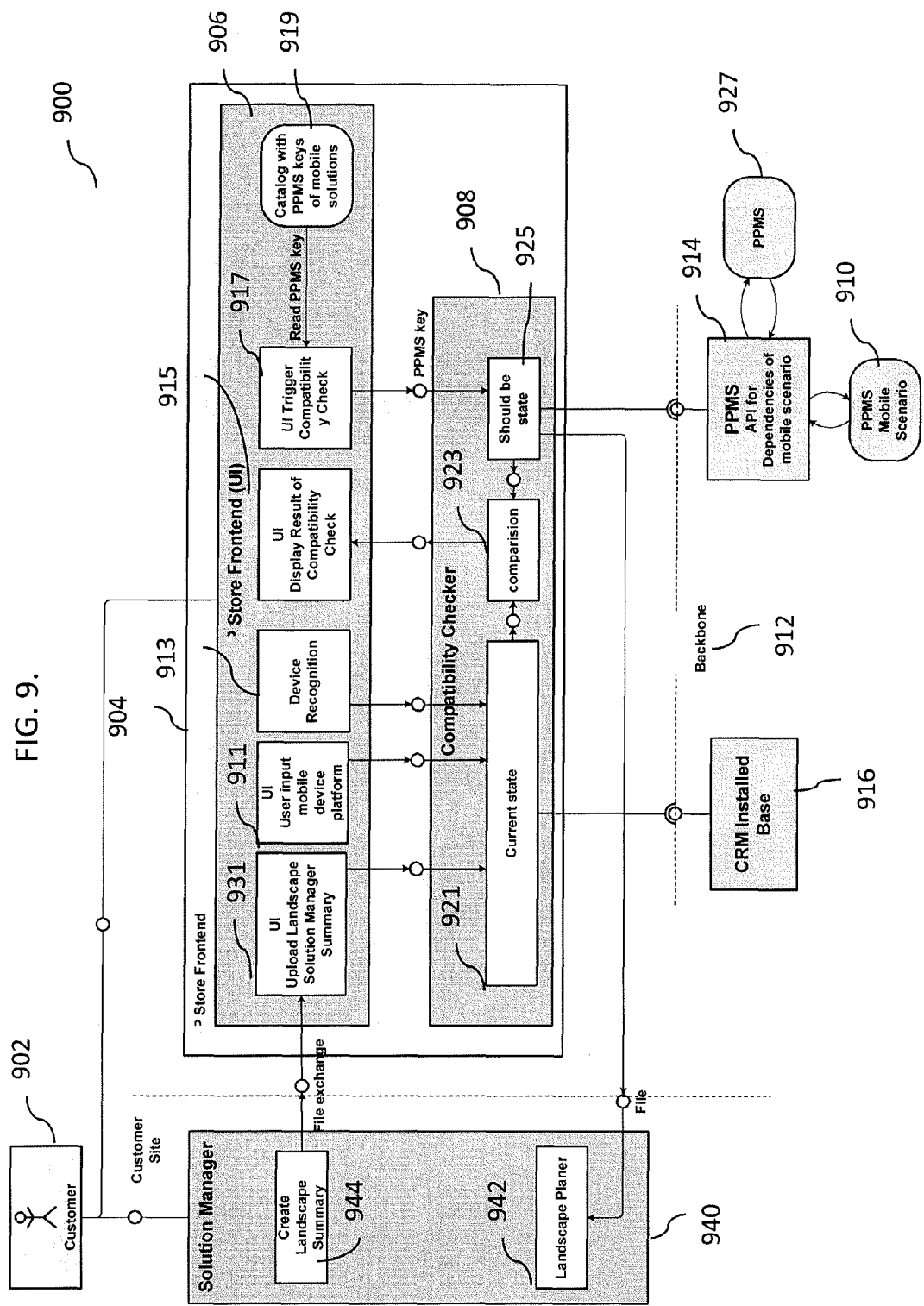
FIG. 9 illustrates another exemplary system for performing a compatibility check, according to some implementations of the current subject matter.

FIG. 9 illustrates another exemplary system 900 for performing a compatibility check, according to some implementations of the current subject matter. Similarly to the system 800 illustrated in FIG. 8, the system 900 can include a store frontend 904 that includes a store frontend user interface 906 and the compatibility checker 908, where the store frontend component 904 can be configured to be coupled to a backbone component 912.

The store frontend user interface 906 can allow the user to provide user input from a mobile device platform 911, can perform recognition of user device 913, can trigger compatibility check 917 based on received PPMS keys 919 corresponding to the business solution/application. The user interface 906 can also be configured to display results of the compatibility checker 915.

In addition to the components shown in FIG. 8, the system 900 can also include a solution manager component 940 that can be located at a customer's site, which can be configured to create a landscape summary 944 for a particular business solution/application that can be based on the information about user's system(s). It can also include applications and/or components that are currently running and/or will be installed in addition to the selected business solution/application. To accommodate receipt of this information, the user interface component 906 can include a user interface portion 931 that can be configured to accommodate uploading of landscape solution manager summary information. This information can be further supplied to the compatibility checker 908 as information relevant to the system's current state 923. The should-be state component 927 of the compatibility checker 908 can be also provide information to the solution manager 940's landscape planner component 942, which can include information about various additional components, operating systems, software, applications, etc. to be installed, cost quotations, time quotations, etc. that may be needed when the selected business solution/application is installed on the user's system.

Similarly to FIG. 8, the compatibility checker component 908 can be configured to include a current state information 921 concerning user's system, where the current state information can be obtained from the backbone 912, using, for example, information obtained from a customer relationship management system's installed base as well as information supplied by the user interface portions relating to the landscape solution manager summary 911, user input 913, and device recognition information 915. The compatibility checker 908 can be configured to include a comparison component 923 that performs comparison of the actual state of the user system to a should-be state 925 of the user system. The future state information can be also supplied from the backbone 912 using PPMS information component 910 and PPMS information 914, 916 that relate to various application dependencies. After the compatibility check, the comparison component 923 can provide information to the user interface 906 for display to the user along with various other information discussed above.

Figure 10:
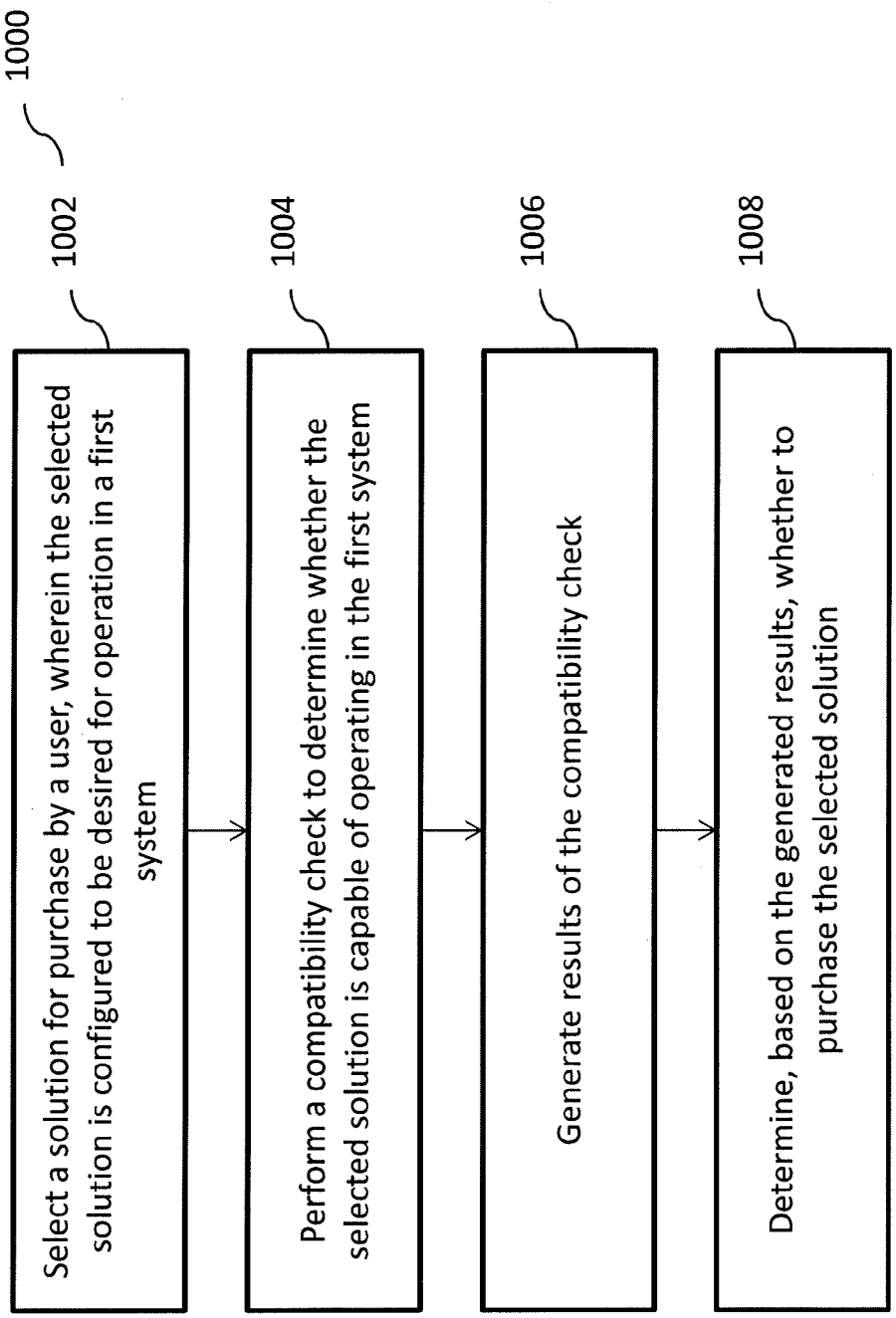
FIG. 10 illustrates an exemplary process, according to some implementations of the current subject matter.

FIG. 10 illustrates an exemplary method 1000 for performing a compatibility check, according to some implementations of the current subject matter. At 1002, the user can select a solution for purchase, wherein the selected solution can be configured to be desired for operation in a first system. At 1004, a compatibility check can be performed to determine whether the selected solution is capable of operating in the first system. At 1006, results of the compatibility check can be generated. At 1008, a determination can be made whether to purchase the selected solution based on the generated results. At least one of the selecting, the performing, the generating, and the determining can be performed on at least one processor.

In some implementations, the current subject matter can be configured to include one or more of the following optional features. The selected solution can be configured to be desired for operation in an enterprise resource planning system. The selected solution can be configured to be desired for operation on at least one device in the enterprise resource planning system. The selected solution can be configured to be desired for operation on a device of the user. The results can include at least one of the following: a determination that the selected solution is capable of operating in the first system, a determination that an additional solution is required for operation of the selected solution in the first system, and a determination that the selected solution is not capable of operating in the first system. The performing can include obtaining information concerning a first state of the first system, wherein the first state corresponds to an actual operation of the first system prior to implementation of the selected solution in the first system, determining a second state of the first system, wherein the second state corresponds to a proposed operation of the first system after implementation of the selected solution in the first system, comparing the first state and the second state to determine whether the selected solution is capable of operating in the first system. The method 1000 can also include triggering, upon selecting the solution, the performing of the compatibility check. The user can be configured to use a mobile device to select the solution.

Figure 11:
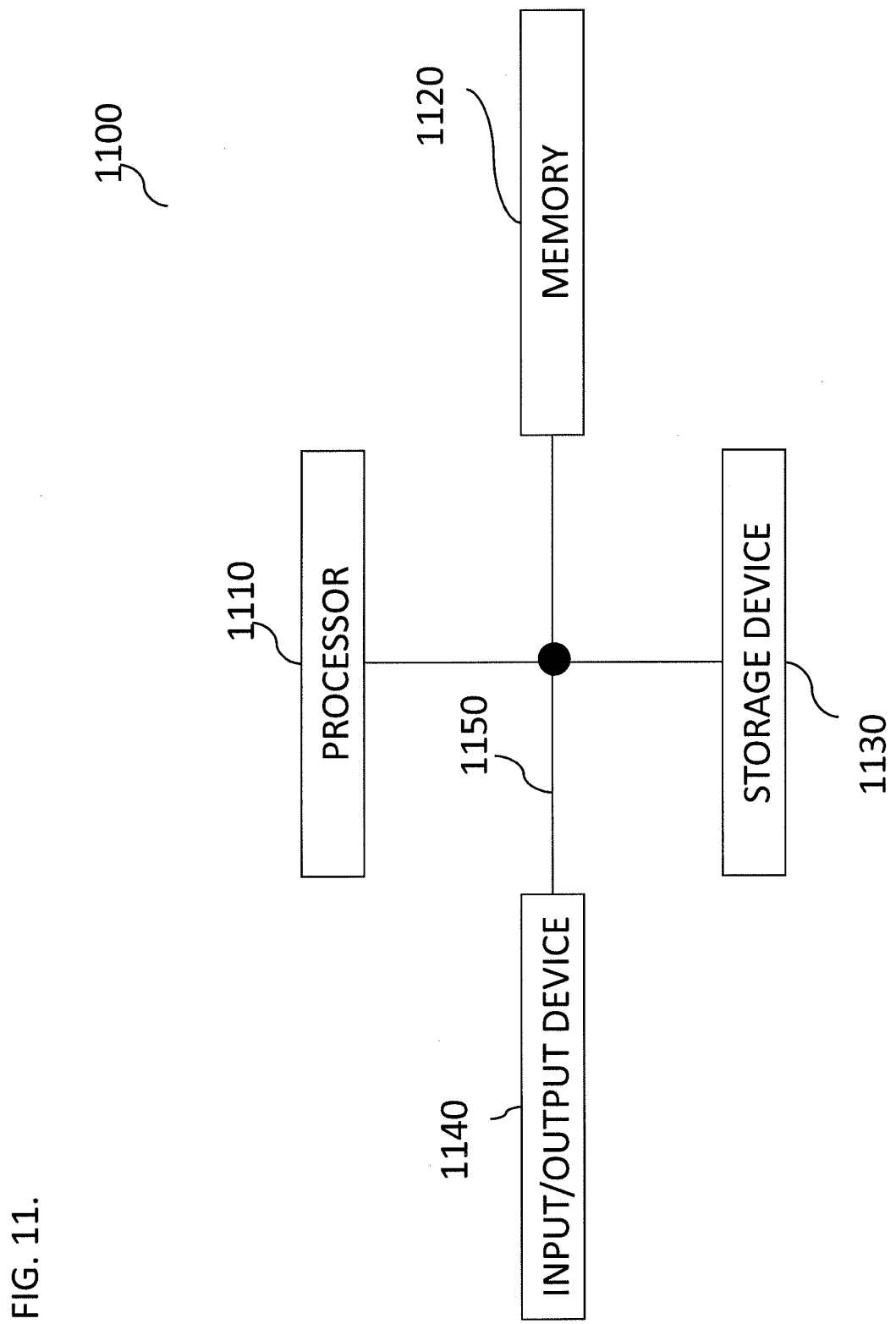
FIG. 11 illustrates an exemplary system, according to some implementations of the current subject matter.

100671 In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit (e.g., a mobile device display) for displaying graphical user interfaces.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   selecting a solution for purchase, wherein the selected solution is configured to be desired for operation in a first system;
   performing a compatibility check to determine whether the selected solution is capable of operating in the first system, wherein the performing further comprises comparing a first state of the first system and a second state the first system to determine whether the selected solution is capable of operating in the first system, wherein the first state corresponds to an actual operation of the first system prior to implementation of the selected solution in the first system, wherein the second state corresponds to a proposed operation of the first system after implementation of the selected solution in the first system;
   generating a result of the compatibility check; and
   enabling, based on the result, purchase of the selected solution to proceed, when the result indicates that the selected solution is capable of operating in the first system;
   providing, based on the result, information regarding purchase of an additional solution required for operation of the selected solution in the first system, when the result indicates that the selected solution is not capable of operating in the first system without the additional solution; and
   terminating, based on the result, purchase of the selected solution, when the result indicates that the selected solution is not capable of operating in the first system, wherein at least one of the selecting, the performing, the generating, the enabling, the providing, and the terminating is performed on at least one processor.

2. The method according to claim 1, wherein the selected solution is configured to be desired for operation in an enterprise resource planning system.

3. The method according to claim 2, wherein the selected solution is configured to be desired for operation on at least one device in the enterprise resource planning system.

4. The method according to claim 1, wherein the selected solution is configured to be desired for operation on a device.

5. The method according to claim 1, wherein the performing of the compatibility check further comprises:
   obtaining information concerning the first state of the first system; and
   determining the second state of the first system.

6. The method according to claim 1, further comprising:
   triggering, upon selecting the solution, the performing of the compatibility check.

7. The method according to claim 1, wherein a mobile device is used to select the solution.

8. A non-transitory computer program product comprising a machine-readable medium storing instructions that, when executed by at least one programmable processor, cause the at least one programmable processor to perform operations comprising:
   selecting a solution for purchase, wherein the selected solution is configured to be desired for operation in a first system;
   performing a compatibility check to determine whether the selected solution is capable of operating in the first system, wherein the performing further comprises comparing a first state of the first system and a second state the first system to determine whether the selected solution is capable of operating in the first system, wherein the first state corresponds to an actual operation of the first system prior to implementation of the selected solution in the first system, wherein the second state corresponds to a proposed operation of the first system after implementation of the selected solution in the first system;

generating a result of the compatibility check; and enabling, based on the result, purchase of the selected solution to proceed, when the result indicates that the selected solution is capable of operating in the first system;

providing, based on the result, information regarding purchase of an additional solution required for operation of the selected solution in the first system, when the result indicates that the selected solution is not capable of operating in the first system without the additional solution; and terminating, based on the result, purchase of the selected solution, when the result indicates that the selected solution is not capable of operating in the first system.

9. The non-transitory computer program product according to claim 8, wherein the selected solution is configured to be desired for operation in an enterprise resource planning system.

10. The non-transitory computer program product according to claim 9, wherein the selected solution is configured to be desired for operation on at least one device in the enterprise resource planning system.

11. The non-transitory computer program product according to claim 8, wherein the selected solution is configured to be desired for operation on a device.

12. The non-transitory computer program product according to claim 8, wherein the performing of the compatibility check further comprises:

obtaining information concerning the first state of the first system;

determining the second state of the first system.

13. The non-transitory computer program product according to claim 8, wherein the operations further comprise:

triggering, upon selecting the solution, the performing of the compatibility check.

14. The non-transitory computer program product according to claim 8, wherein a mobile device is used to select the solution.

15. A system comprising:

at least one programmable processor; and a machine-readable medium storing instructions that, when executed by the at least one programmable processor, cause the at least one programmable processor to perform operations comprising:

selecting a solution for purchase, wherein the selected solution is configured to be desired for operation in a first system;

performing a compatibility check to determine whether the selected solution is capable of operating in the first system, wherein the performing further comprises comparing a first state of the first system and a second state the first system to determine whether the selected solution is capable of operating in the first system, wherein the first state corresponds to an actual operation of the first system prior to implementation of the selected solution in the first system, wherein the second state corresponds to a proposed operation of the first system after implementation of the selected solution in the first system;

generating a result of the compatibility check; and enabling, based on the result, purchase of the selected solution to proceed, when the result indicates that the selected solution is capable of operating in the first system;

providing, based on the result, information regarding purchase of an additional solution required for operation of the selected solution in the first system, when the result indicates that the selected solution is not capable of operating in the first system without the additional solution; and terminating, based on the result, purchase of the selected solution, when the result indicates that the selected solution is not capable of operating in the first system.

16. The system according to claim 15, wherein the selected solution is configured to be desired for operation in an enterprise resource planning system.

17. The system according to claim 16, wherein the selected solution is configured to be desired for operation on at least one device in the enterprise resource planning system.

18. The system according to claim 15, wherein the selected solution is configured to be desired for operation on a mobile device.

* * * * *